US007636868B2

(12) United States Patent
Hoffman et al.

(10) Patent No.: US 7,636,868 B2
(45) Date of Patent: Dec. 22, 2009

(54) DATA REPLICATION IN A DISTRIBUTED SYSTEM

(75) Inventors: William R. Hoffman, Berkeley, CA (US); Marcus J. Jager, Boulder Creek, CA (US); John P. MacCormick, San Francisco, CA (US); Kristof Roomp, Seattle, WA (US); Chandramohan A. Thekkath, Palo Alto, CA (US); Lidong Zhou, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 11/476,974

(22) Filed: Jun. 27, 2006

(65) Prior Publication Data

US 2007/0299955 A1 Dec. 27, 2007

(51) Int. Cl.
*G06F 11/00* (2006.01)
(52) U.S. Cl. .......................................... 714/13; 709/223
(58) Field of Classification Search ..................... 714/13
See application file for complete search history.

(56) References Cited

U.S. PATENT DOCUMENTS

| 6,049,809 | A |  | 4/2000 | Raman et al. ................ 707/203 |
|---|---|---|---|---|
| 6,138,124 | A |  | 10/2000 | Beckhardt .................... 707/201 |
| 6,151,640 | A | * | 11/2000 | Buda et al. ..................... 710/11 |
| 6,477,583 | B1 |  | 11/2002 | Zayas et al. .................. 709/248 |
| 6,615,223 | B1 |  | 9/2003 | Shih et al. .................... 707/201 |
| 6,643,795 | B1 |  | 11/2003 | Sicola et al. ..................... 714/6 |
| 6,973,464 | B1 |  | 12/2005 | Gao ............................. 707/201 |
| 2003/0172157 | A1 |  | 9/2003 | Wright et al. ................ 709/225 |
| 2003/0204557 | A1 |  | 10/2003 | Mandal et al. ............... 709/202 |
| 2004/0111390 | A1 |  | 6/2004 | Saito et al. ....................... 707/1 |
| 2004/0165610 | A1 |  | 8/2004 | Chasin ......................... 370/428 |
| 2005/0044088 | A1 |  | 2/2005 | Lindsay et al. .............. 707/100 |

FOREIGN PATENT DOCUMENTS

EP 0 600 458 5/1999

OTHER PUBLICATIONS

Malkhi, D. et al., "Secure and Scalable Replication in Phalanx", 17th IEEE Symposium on Reliable Distributed Systems, Oct. 1998, http://ieeexplore.ieee.org/search/wrapper.jsp?arnumber=740474, 8 pages.

(Continued)

*Primary Examiner*—Scott T Baderman
*Assistant Examiner*—Kamini Patel
(74) *Attorney, Agent, or Firm*—Woodcock Washburn LLP

(57) ABSTRACT

A global state management service manages replication in a distributed system. A distributed system can have several replica groups. The global state management service manages state associated with each replica group. Data replication is implemented without implementing an instance of a state machine on each device in a replica group. A replica group comprises a primary device and at least one secondary device. Each device in a replica group contains a replica of data of interest. The global state management service manages the allocation of primary and secondary devices. In the absence of a failure in either a primary device or a secondary device, read and write operations are performed without consulting the global state management service. When a failure is detected, the global state management service manages failover.

20 Claims, 3 Drawing Sheets

OTHER PUBLICATIONS

Popescu, B.C. et al., "Secure Data Replication over Untrusted Hosts", ftp://ftp.cs.vu.nl/pub/papers/globe/hotos.03.pdf, 6 pages.

Sandhu, H.S. et al., "Cluster-Based File Replication in Large-Scale Distributed Systems", *Computer Systems Research Institute*, Technical Report CSRI-255, Jan. 1992, ftp://ftp.cs.toronto.edu/pub/reports/csri/255/frolic.ps.z.

Zheng, L. et al., "Using Replication and Partitioning to Build Secure Distributed Systems", *Proceedings of the 2003 IEEE Symposium on Security and Privacy, Department of Computer & Information Science Department Papers (CIS)*, 20003, http://repository.upenn.edu/cgi/viewcontent.cgi?article=1056&context=cis_papers, 15 pages.

* cited by examiner

DATA REPLICATION IN A DISTRIBUTED SYSTEM

TECHNICAL FIELD

The technical field generally relates to computing systems and more specifically to replicating data in a distributed computing system.

BACKGROUND

Data replication is the process of maintaining multiple copies of data in a distributed system. Typically, a copy of the data, referred to as a replica, is maintained on each device, such as a server for example, of the distributed system. Data replication is useful in the event of a failure of one of the devices, because a replica can be used to recover from the failure. Also, data replication can provide improved system performance. An application executing on the system can access a specific replica to improve access times and minimize traffic within the system.

In the event of a failure, recovery can be achieved via a process referred to as failover. Failover is the process by which a device having a replica of the data takes over processing for the failed device. Typical distributed systems that support replication and failover implement an approach, wherein each device in the distributed system having a replica stored thereon, also has an instance of a specific state machine stored thereon. All commands and operations, such as reads and writes, go through multiple rounds of message exchanges between the devices to execute a command, in addition to requests to stable storage (e.g., disks). For concerns of efficiency, it is desirable to decrease the number of message exchanges as well as the number of requests to stable storage.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A global state management service is utilized to manage replication in a distributed system. The global state management service designates one of the devices of the system as a primary device, and at least one other device as a secondary device. In an example configuration, the global state management service is implemented on a dedicated device that is neither the primary device nor a secondary device. In another example embodiment, the global state management service is implemented on a plurality of devices to ensure fault tolerance. The primary device contains a replica of the data of interest, and each secondary device contains a respective replica of the data of interest. The global state management service manages the allocation of primary and secondary devices. An example system can contain several replica groups, each replica group having a primary device and at least one secondary device. In such a system, a global state management service can perform management functions for more than one replica group. A user of the system typically interacts with the replica in the primary device. In the absence of a failure in either a primary device or a secondary device, read and write operations are performed without consulting the global state management service. When a failure is detected in the primary device, the global state management service manages failover. That is, the global state management service reallocates one of the secondary devices as the primary device. The replica stored on the reallocated primary device is used to assume processing for the failed primary device. Failover is accomplished automatically without user intervention. When a failure is detected in a secondary device, the global state management service records that the device is dead. If the primary device wishes to commit a write operation while there are dead secondary devices then it first updates the global state management service indicating that the dead devices are also stale. When this action is taken, the global state management system grants the primary a lease for a predetermined amount of time, authorizing it to commit write operations. A primary may renew the lease any time before the lease expires. The primary may not perform a write when there is a stale replica unless it possesses a lease granted by the global state management system.

In an example embodiment, if all of the secondary devices are stale, the secondary device to be designated as the primary device during failover contains a stale replica. In this event, the global state management service waits a predetermined amount of time (equal to or greater than the lease) after detecting a failure in the primary device to execute failover. In a scenario in which the primary device has not actually failed, but is merely slow to respond, for example, waiting a predetermined amount of time before executing failover prevents the occurrence of two devices each thinking it is the primary in the replica group and performing conflicting writes. The old primary would have lost its lease and will not commit writes. In many cases it is acceptable for the (old) primary to return outdated values on reads. For cases in which this is not acceptable, a replica takes the lease when it becomes the primary (not when it declares a secondary stale) and retains the lease for all reads and writes.

In an example embodiment, the write operations can be executed indivisibly on the local stable storage. In this case, to commit a write request, the primary device contacts all secondaries that are alive with the data to be written. Upon message receipt, each secondary updates its local device and replies to the primary, which considers the write committed. This involves a single round of message exchange and a single request to stable storage on each device. When there is a failover to a new primary, the primary ensures that all secondaries that are alive contain the same contents of the data.

BRIEF DESCRIPTION OF THE DRAWINGS

The foregoing summary, as well as the following detailed description, is better understood when read in conjunction with the appended drawings. For the purpose of illustrating data replication in a distributed system, there is shown in the drawings exemplary constructions thereof; however, data replication in a distributed system is not limited to the specific methods and instrumentalities disclosed.

DETAILED DESCRIPTION OF ILLUSTRATIVE EMBODIMENTS

Figure 1:
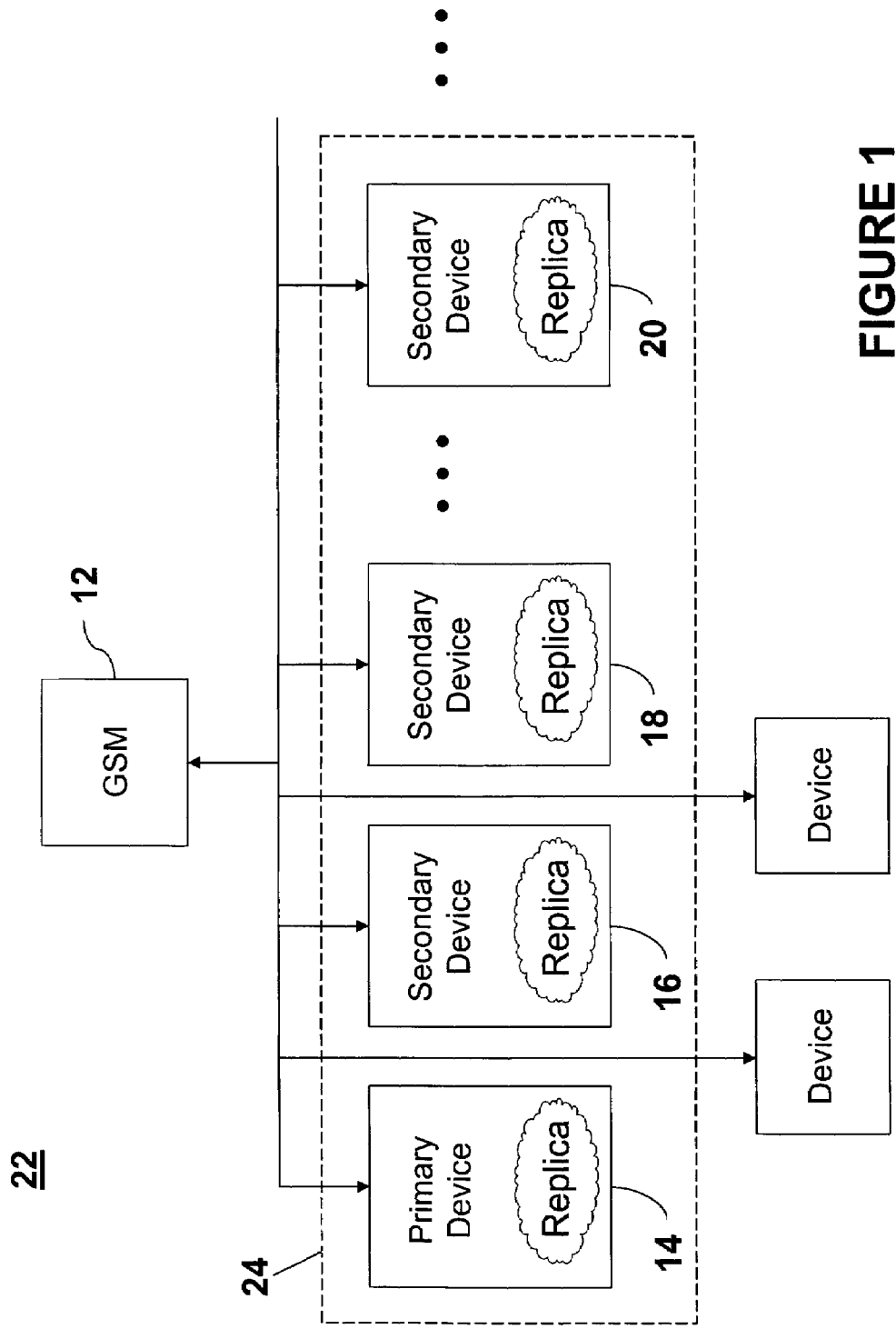
FIG. 1 is a functional block diagram of an example system for replicating data in a distributed system.

Rather than implement an instance of a state-machine on each device of a distributed system, a single global state management service is utilized to manage replication for a replica group in the distributed system. A distributed system can have several replica groups and a single global management service can manage multiple replica groups, and/or different global state management services can each respectively manage different replica groups. To ensure reliability, a global state management service can be implemented on multiple devices. FIG. 1 is a functional block diagram of an example system 22 for replicating data in a distributed system. The system 22 comprises the global state management service (GSM) 12, a primary device 14, and at least one secondary device 16, 18, 20. To protect data in the system 22, copies of the data are stored on selected devices (also referred to as machines). Each selected machine receives one copy of the data. Each copy is called a replica. The set of machines having replicas are referred to as a replica group 24. The replica group 24 has a designated primary machine 14 and one or more secondary machines 16, 18, 20. If the designated primary machine 14 were to fail for some reason, one of the secondary machines 16, 18, 20 will transparently (from the user's perspective) take over as the primary machine for the replica group. A user, via the user's client processor, initiates operations at the primary machine 14. If a client processor incorrectly initiates an operation at a machine that is not the primary machine 14, an error is returned, with the identity of the correct primary machine.

The primary device 14 has stored thereon a replica of data of interest. The data of interest can comprise any type of data, such as image data (e.g., a photograph), textual data (e.g., a MICROSOFT® WORD document or portion thereof), spreadsheet data (e.g., a MICROSOFT® EXCEL document or portion thereof), video data, multimedia data, a program, or any arbitrary data, for example. Each secondary device 16, 18, 20 also has a replica stored thereon. The system 22 also can contain devices that are not designated as either a primary or secondary device. A device as described herein can comprise any appropriate storage device capable of storing data, any appropriate processor, such as a server processor for example, or a combination thereof.

The global state management service 12 manages and maintains information about the replicas stored in the devices. The global state management service 12 determines and allocates which device is to be designated as the primary device and which devices are to be designated as secondary devices for a replica group. The global state management service 12 records for the primary device 14 and each secondary device 16, 18, 20 which one of three possible states it is in, namely, alive, dead or stale. Alive means the device/replica is working and contains a correct current copy of all data. Dead means the device/replica is not functioning but still contains a correct current copy of all data. Stale means that the device/replica is not functioning and the replica is out of date because one or more of its files are missing committed updates. Absent a failure in one of the devices, 14, 16, 18, 20, the primary device 14 manages all read and write operations without interaction with the global state management service 12.

Under normal operation, the data replica in a primary device is utilized for processing. The primary device performs client-visible operations associated with the data. For example, if the data comprises a MICROSOFT® WORD document, the MICROSOFT® WORD document in the primary device 14 will be used during processing under normal operation. Read operations are directly serviced by the primary device without contacting any other device. Write operations are serviced by the primary device which replicates the write operation to each device that is alive. These operations are performed without consulting the global state management service 12. If the primary device 14 fails, however, the global state management service 12 manages recovery of the system 22 to accommodate the failure. The global state management service 12 initiates failover. As described above, failover is the process by which a device having a replica takes over processing for the failed device. Thus, if the primary device 14 fails, the global state management service 12 reallocates one of the secondary devices 16, 18, 20 as the new primary device. The replica is utilized to assume processing for the replica of the failed primary device. Thus, if the data comprises a MICROSOFT® WORD document, and the primary device fails, the global state management service 12 will allocate one of the secondary devices 16, 18, 20 as the primary device, and the replica MICROSOFT® WORD document in the reallocated primary device will be used to assume processing for the failed primary device.

When a failure is detected in a secondary device, the global state management service records the failure of the device. If the primary device wishes to perform a write operation while there is a dead secondary device(s), the primary device first updates the global state management service indicating that the dead device(s) is also stale. When this action is taken, the global state management system grants the primary a lease for a predetermined time, authorizing it to perform write operations. A primary can renew the lease (extend the time period) at any time prior to the expiration of the lease. Thus, the primary device is prevented from performing a write operation on a stale replica unless the primary has been granted a lease by the global state management system for the stale replica.

While there are stale replicas, the primary device periodically checks with the global state management service 12 to renew its lease and to confirm that it is still the designated primary. This is because if the secondary device to be designated as the primary device during a failover contains a stale replica, the time period of the lease must elapse before the global state management service 12 initiates failover. This prevents the replica group 24 from having two primary devices allocated. For example, if the primary device 14 has not failed, but is slow to respond to the global state management service 12, the global state management service 12 could determine that the primary device 14 has failed. If the global state management service 12 were to immediately initiate failover, a stale secondary device could be allocated as the primary device before the original primary device has had a chance to respond or check if it is still primary. To avoid this occurrence, the global state management service 12 waits a predetermined amount of time for the lease held by the old primary to expire before it reallocates one of the secondary devices as the primary device. For example 5 minutes would be a suitable time period.

If failover is to occur, and all of the secondary devices were stale, the secondary device to be designated as the primary device during failover would contain a stale replica. Thus, after detecting the failure in the primary device, the global state management service would wait a predetermined amount of time until the lease expires, before executing failover. This is advantageous, for example, in situation in which the primary has not actually failed (e.g., slow to respond). Waiting a predetermined amount of time until the lease expires before executing failover prevents the occurrence of two devices each thinking it is the primary in the replica group and attempting to perform conflicting write operations. In this situation the old primary would have lost its lease (the lease would have expired) and thus would not commit writes. In many cases, however, it is acceptable for the old primary to return outdated values on reads. If this is not acceptable however, a replica takes the lease when it becomes the primary (not when it declares a secondary stale) and retains the lease for all reads and writes.

In order to implement automatic failover and maintain the consistency of a given replica group 24 in the presence of arbitrary machine failure and/or network failure, information about the state of the replica group is maintained. This information is stored in the global state management service 12. In an example embodiment, a portion of this information is stored as additional data on each device in the replica group 24. In an example embodiment, the global state management service utilizes a consensus protocol to manage the state of the replica group 24. Any appropriate consensus protocol can be utilized, such as a consensus protocol in accordance with the known Paxos algorithm, for example. A distributed system can have several replica groups. The state of each replica group is maintained by a single global state management service for that replica group. Other replica groups may use a different global state management service. The global state management service provides services for managing state associated with each replica group. In an example embodiment, to ensure reliability and fault tolerance, a global state management service can be implemented on multiple servers.

The global state management service 12 automatically controls placement of replicas in devices of the system 22. In an example embodiment, replicas are distributed uniformly across devices of a replica group. The identity of each replica group is maintained by the global state management service 12. When a failure, or error, is detected, such as a disk error, a file system failure, a remote error due to networking, or a process failure, for example, the global state management service 12 executes, via the devices in the replica group with the failure, one or more global state change operations and initiates a failover protocol. The nature of the actions, as described in more detail below, depends upon several factors including whether the device that encountered the error was acting as a primary device or as a secondary device.

In addition to the failover actions, each device executes specific recovery actions as part of its startup procedure. The recovery actions involve reconciling differences in files that were being replicated when the failure was detected. In an example embodiment, to speed up the recovery process, each device maintains data structures that are stored on files replicated on multiple devices.

In an example embodiment, to execute write operations on local stable storage, the primary device contacts all secondaries that are alive with the data to be written. Upon message receipt, each secondary updates its local device and replies to the primary. Upon receipt of the reply from a secondary, the primary device considers the write committed for that secondary. This is accomplished via a single round of message exchange and a single request to stable storage on each device. When there is a failover to a new primary, the primary ensures that all secondaries that are alive contain the same contents of the data. At any time, the current functioning primary device may service a read operation from the local stable storage without consulting any other device.

The process by which the identity of a primary device is changed either due to failure, or for other reason, is part of the automatic failover mechanism and is implemented within each device. The identity of the primary device can be changed by an operator or an automatic policy module, if it is determined that a particular device is overloaded.

The global state management service 12 manages the state of the replica group 24 by managing the identity of the primary device and managing information used to perform failover and data updates in the event of a failure. In an example embodiment, the global state management service 12 is implemented as a separate executable and interfaces with an executable (referred to as a storage node) residing on each device in the replica group 24. A copy of the global state of the replica group 24 is stored on each device of the replica group 24. As the global state is modified, the individual copies are updated accordingly. The global state management service 12 executes specific commands (also referred to as decrees) that alter the state of the replica group 24. In this example embodiment, the commands are executed in the same order, by using the Paxos consensus protocol. The Paxos consensus protocol is a majority based consensus algorithm and requires a majority of the copies to be up and running in order to proceed.

Figure 2:
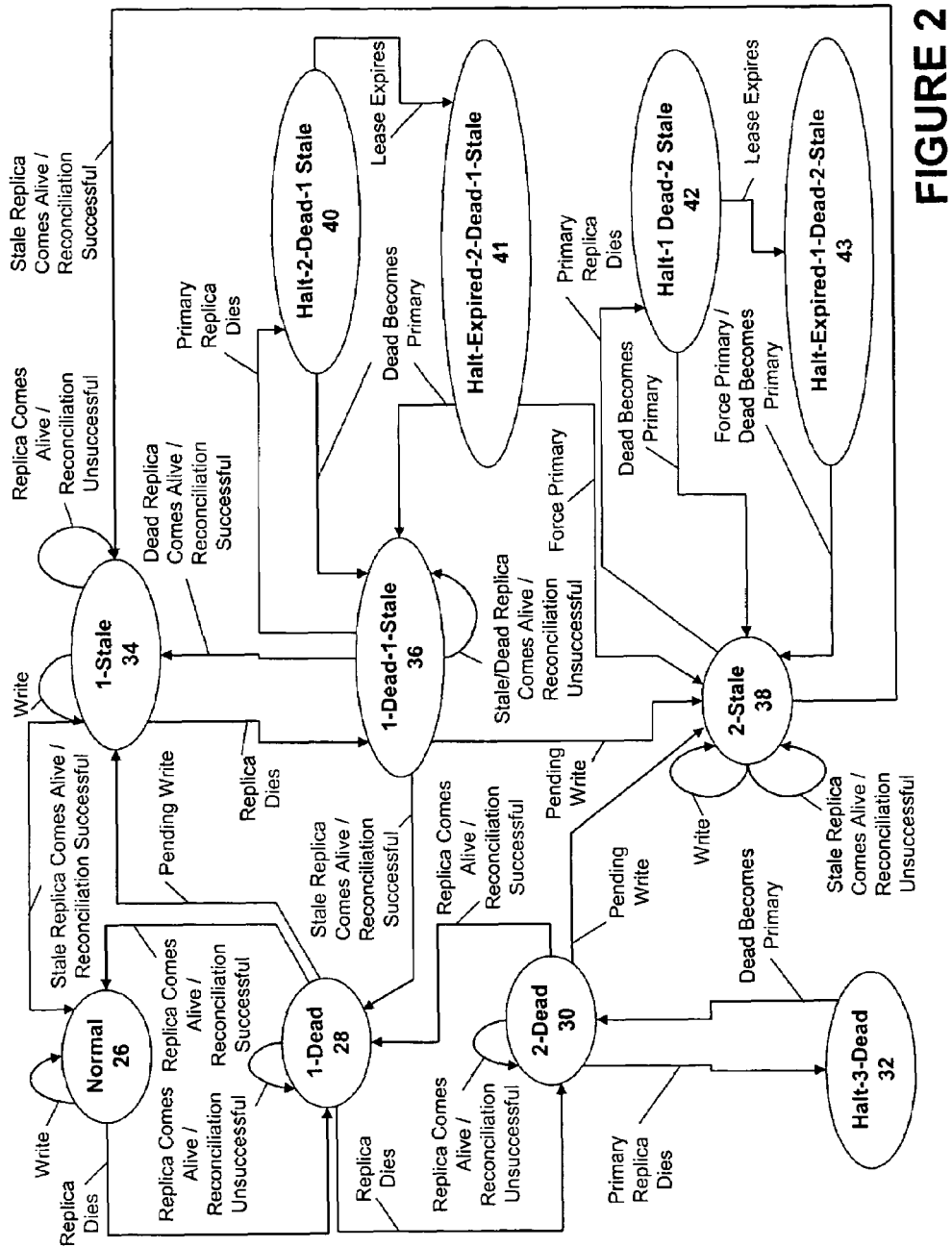
FIG. 2 is an example state diagram of a process for data replication in a distributed system.

FIG. 2 is an example state diagram of a process for data replication in a distributed system. FIG. 2 depicts the various valid states and valid transitions between states that can occur in a replica group. Note that the entire system can crash (because of a power failure) leaving the overall system in valid state. The state diagram depicted in FIG. 2 is representative of an example configuration having three replicas, one replica in each of a single primary device and two secondary devices. The global state management service maintains state information for the replica group.

The normal state 26 indicates that all devices, including the primary device, are operational, alive and well. Starting from the normal state 26, two events can occur. A replica (either in a primary device or a secondary device) can die or a write can occur at the primary device. A dead replica is an indication that the device comprising the dead replica is non-operational. If a replica dies, the state of the system transitions to the 1-Dead state 28. The 1-Dead state 28 indicates that one replica has died. The global state management service transitions the state of the system to the 1-Dead state 28 upon receiving a dead decree from the primary device or one of the secondary devices if the primary is the device that failed. Because a dead decree can be provided by more than one device, in the case where two replicas die, the global state management service will transition to the 1-Dead state upon receipt of the first dead decree. Later decrees are handled in the 1-Dead state as described below. If the replica that died is the replica on the primary device, the global state management service reallocates another live (secondary) device as the primary device. If a write occurs at the primary device, no decree is passed. The state of the system remains in the normal state 26. Also, other replicas are updated to reflect the write.

The 1-Dead state 28 indicates that the three replicas in the primary and two secondary devices, respectively, are fresh and that one replica is dead. A fresh replica is a replica having the contents of all its files up to date. When the group is in a 1-Dead state 28, the primary device/replica can be a different primary device/replica than when the group was in the normal state 26. In the 1-Dead state 28, four events can occur. The previously dead replica can come alive (become operational), one of the replicas can die, a read can occur, and a write can occur.

If the previously dead replica comes becomes operational, typically because the device containing the replica is now operational, the primary device and the global state management service coordinates reconciliation of the system. Reconciliation comprises fully integrating the newly alive device into the system. This process makes sure that the replica has the same data in all files as the current primary device. If reconciliation is successful, the primary passes a join decree and the global state management service transitions the system to the normal state 26. If reconciliation is not successful, the global state management service keeps the system in the 1-Dead state 28 (maintains an indication that the failed device is not operational). If an existing alive replica dies, the global state management service transitions the state of the system to the 2-Dead state 30. The global state management service transitions the state of the system to the 2-Dead state 30 upon receiving a dead decree from the primary device or a secondary device if the primary is the device that failed. If the primary receives a write while in the 1-Dead state 28 it may choose to fail the write. No files will be changed, no decree is passed and the system remains in the 1-Dead state 28. Otherwise the primary passes a stale decree and the global state management service transitions the state of the system to the 1-Stale state 34. Only when successfully in the 1-Stale state 34 will the primary and other replicas (which will be one in the example three-replica system) be updated to reflect the write. A replica is Stale when one or more of its files are missing committed updates. A replica is considered stale when it suffers a failure, or the device comprising the replica suffers a failure, and the other replicas accept writes that update the contents of their respective files. Thus, a stale device comprises a non-operational device that has not been updated by a write operation.

The replica that becomes operational will provide a request to the primary device to finish initialization to reconcile any writes that may have been in progress at the time it died. If the replica is also stale it also will need to reconcile any writes that it did not receive while it was failed. Until the reconciliation is successfully completed, the system stays in the 1-Dead state 28. When the system transitions from the 1-Dead state 28 to the normal state 26, a different device may be acting as the primary device, than when the system was previously in the normal state 26.

The 2-Dead state 30 indicates that the replica in the primary device and the replicas in the secondary devices are fresh, and that two of the replicas are dead. In the 2-Dead state 30, three events can occur. One of the previously dead replicas can come alive, the final remaining replica (the primary) can die, and a write can occur. If one of the previously dead replicas comes alive, the primary device and the global state management service coordinate reconciliation of the system. If reconciliation is successful, the primary passes a join decree and the global state management service transitions the system to the 1-Dead state 28. If reconciliation is not successful, the system remains the 2-Dead state 30. If a read occurs, no decree is passed. The state of the system remains in the 2-Dead state 30. If the primary replica dies, the global state management service transitions the state of the system to the Halt-3-Dead state 32. The Halt-3-Dead state 32 indicates that there are no more devices remaining to initiate a decree or perform operations. The global state management service transitions the state of the system to the Halt-3-Dead state 32 upon receiving a dead decree. If the primary receives a write while in the 2-Dead state 30 it may chooses to fail the write. No files will be changed, no decree is passed and the system remains in the 2-Dead state 30. Otherwise the primary passes a stale decree and the global state management service transitions the state of the system to the 2-Stale state 38. Only when successfully in the 2-Stale state 38 will the primary and other replicas (which will be none in the example three-replica system) be updated to reflect the write.

The 1-Stale state 34 indicates that two replicas are alive and fresh, and one is stale. In the stale state, three events can occur. The stale replica can come alive, one of the live replicas can die, and a write can occur. If a stale replica comes alive, the primary device and global state management service coordinates reconciliation of the system. If reconciliation is successful, the primary device passes a join decree that transitions the system to the normal state 26. If reconciliation is not successful, the global state management service keeps the system in the 1-Stale state 34. If one of the live replicas dies, the global state management service transitions the system to the 1-Dead-1-Stale state 36. The global state management service transitions the state of the system to the 1-Dead-1-Stale state 36 upon receiving a dead decree from the primary device or a secondary device if the primary is the device that failed. If a write occurs, other replicas (which is only one in the example three-replica system) are updated to reflect the write. The state of the system remains in the 1-Stale state 34.

The 1-Dead-1-Stale state 36 indicates that the there are two dead devices in the system, one of which is stale. In the 1-Dead-1-Stale state, four events can occur. The stale replica can come alive, the dead replica can come alive, the primary replica can die, and a write can occur. If the stale replica comes alive, the primary device and the global state management service coordinate reconciliation of the system. If reconciliation is successful, the primary device passes a join decree that global state management service transitions the system to the 1-Dead state 28. If reconciliation is not successful, the global state management service keeps the system in the 1-Dead-1-Stale state 36. If the dead replica comes alive, the primary device and the global state management service coordinate reconciliation of the system. If reconciliation is successful, the primary device passes a join decree that global state management service transitions the system to the 1-Stale state 34. If reconciliation is not successful, the global state management service keeps the system in the 1-Dead-1-Stale state 36. If the primary replica dies, the global state management service transitions the system to the Halt-2-Dead-1-Stale state 40. If the primary receives a write while in the 1-Dead-1-Stale state 36 it may chooses to fail the write. No files will be changed, no decree is passed and the system remains in the 1-Dead-1-Stale state 36. Otherwise the primary passes a stale decree and the global state management service transitions the state of the system to the 2-Stale state 38. Only when successfully in the 2-Stale state 38 will the primary and other replicas (which will be none in the example three-replica system) be updated to reflect the write.

The 2-Stale state 38 indicates that the system contains two stale replicas. In the 2-Stale state 38, three events can occur. A stale replica can come alive, the primary replica can die, and a write can occur. If the stale replica comes alive, the primary device and global state management service coordinates reconciliation of the system. If reconciliation is successful, the primary device passes a join decree that transitions the system to the 1-Stale state 34. If reconciliation is not successful, the global state management service keeps the system in the 2-Stale state 38. If the primary replica dies, the global state management service transitions the system to the Halt-1-Dead-2-Stale state 42. If a write occurs, other replicas (which is none in the example three-replica system) are updated to reflect the write. The state of the system remains in the 2-Stale state 38.

The Halt-3-Dead state 32 indicates that the replicas have failed and that none of the failed replicas are stale. In the Halt-3-Dead state 38, the only possible event is that one of the replicas comes alive. When the replica comes alive, it becomes the primary device and the global state management service transitions the system to the 2-Dead state 30.

The Halt-2-Dead-1-Stale state 40 indicates that all the replicas have failed and that one of the failed replicas is stale. In the Halt-2-Dead-1-Stale state 40, two events can occur. One of the dead replicas can come alive, or the lease timer can expire. If a dead replica comes alive, it becomes the primary device and the global state management service transitions the system to the 1-Dead-1-Stale state 36. If the lease expires, while in the Halt-2-Dead-1 Stale state 40, the global state management service transitions the system to the Halt-Expired-2-Dead-1-Stale state 41.

The Halt-Expired-2-Dead-1-Stale state 41 indicates that all the replicas have failed, that one of the failed replicas is stale and the lease timer has expired. In the Halt-Expired-2-Dead-1-Stale state 41, two events can occur. One of the dead replicas can come alive, or the stale replica is forced to become the primary replica. If the a dead replica comes alive, it becomes the primary device and the global state management service transitions the system to the 1-Dead-1-Stale state 36. If the stale replica is forced to become the primary replica, it passes a ForcePrimary decree that transitions the system to the 2-Stale state 38. This decree causes it to be the primary device and marks the other replicas as stale.

The Halt-1-Dead-2-Stale state 42 indicates that all the replicas have failed and that two of the failed replicas are stale. In the Halt-1-Dead-2-Stale state 42, two events can occur. The dead replica can come alive, or the lease timer can expire. If the dead replica comes alive, it becomes the primary device and the global state management service transitions the system to the 2-Stale state 38. If the lease expires, while in the Halt-1-Dead-2 Stale state 42, the global state management service transitions the system to the Halt-Expired-1-Dead-2-Stale state 43.

The Halt-Expired-1-Dead-2-Stale state 43 indicates that all the replicas have failed, that two of the failed replicas are stale and the lease timer has expired. In the Halt-Expired-1-Dead-2-Stale state 43, two events can occur. The dead replica can come alive, or one of the stale replicas is forced to become the primary replica. If the dead replica comes alive, it becomes the primary device and the global state management service transitions the system to the 2-Stale state 38. If one of the stale replica is forced to become the primary replica, it passes a ForcePrimary decree that transitions the system to the 2-Stale state 38. This decree causes it to be the primary device and marks the other replicas as stale.

These halt states pertain to the example three-replica system depicted by FIG. 2. It is to be understood however, that a system can contain more or less devices/replicas, and that a respective state diagram would contain appropriately more or less halt states, along with corresponding more or less dead and stale states.

Figure 3:
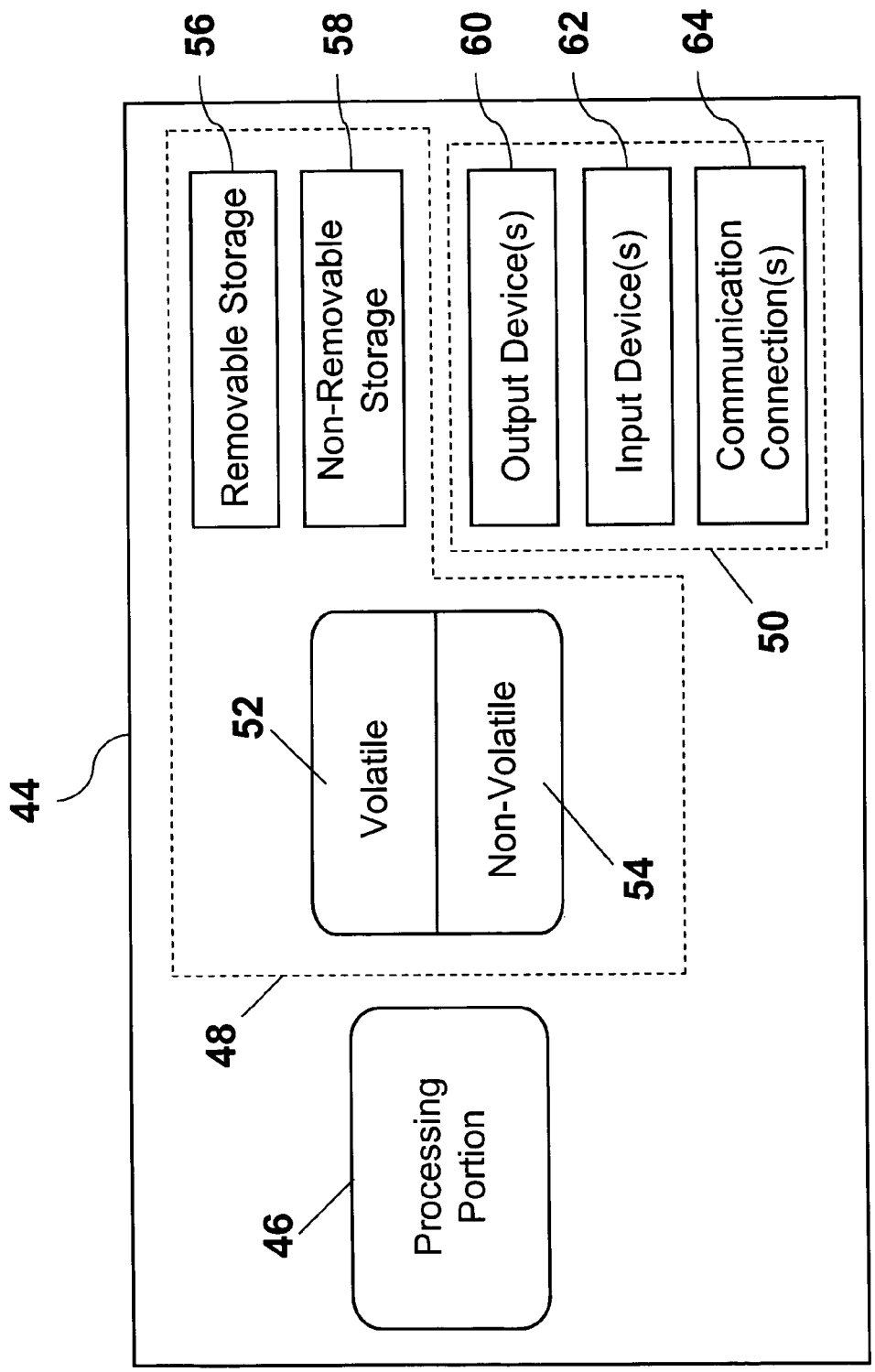
FIG. 3 is a diagram of an example computing device 44 for replicating data in a distributed system.

FIG. 3 is a diagram of an example computing device 44 for replicating data in a distributed system. Each device of the distributed system can comprise computing device 44. For example, each of the global state management service 12, the primary device 14, and secondary devices 16, 18, and 20, of FIG. 1 can comprise a computing device 44. The computing device 44 can be implemented as a client processor and/or a server processor. The computing device 44 comprises a processing portion 46, a memory portion 48, and an input/output portion 50. The processing portion 46, memory portion 48, and input/output portion 50 are coupled together (coupling not shown in FIG. 3) to allow communications therebetween.

The processing portion 46 is capable of performing the operations associated with replicating data in a distributed system. For example, the processing portion 46 is capable of maintaining state information, determining if a device is a primary device or a secondary device, allocating a device as primary or secondary, determining if a device has failed, implementing failover without a predetermined waiting period, implementing failover with a predetermined waiting period, updating replicas, reconciling replicas, and transitioning the system between various states. The memory portion 48 is capable of storing all parameters associated with replicating data in a distributed system, such as state information, and whether a device is a primary device or a secondary device, for example. Input/output portion 50 is capable of providing and/or receiving components utilized to replicate data in a distributed system, such as sending/receiving decrees for example.

Depending upon the exact configuration and type of processor, the memory portion 48 can be volatile (such as RAM and/or cache) 52, non-volatile (such as ROM, flash memory, etc.) 54, or a combination thereof. The computing device 44 can have additional features/functionality. For example, the computing device 44 can include additional storage (removable storage 56 and/or non-removable storage 58) including, but not limited to, magnetic or optical disks, tape, flash, smart cards or a combination thereof. Computer storage media, such as memory portion 48, 52, 54, 56, and 58, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 44. Any such computer storage media can be part of the computing device 44.

The computing device 44 also can contain communications connection(s) 64 that allow the computing device 44 to communicate with other devices, such as a storage device having controlled access, for example. Communications connection(s) 64 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 44 also can have input device(s) 62 such as keyboard, mouse, pen, voice input device, touch input device, etc. Output device(s) 60 such as a display, speakers, printer, etc. also can be included.

The various techniques described herein can be implemented in connection with hardware or software or, where appropriate, with a combination of both. Thus, the methods and apparatuses for replicating data in a distributed system or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for controlling access to a storage device.

The program(s) can be implemented in assembly or machine language, if desired. In any case, the language can be a compiled or interpreted language, and combined with hardware implementations. The methods and apparatuses for replicating data in a distributed system also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for controlling access to a storage device. When implemented on a general-purpose processor, the program code combines with the processor to provide a unique apparatus that operates to invoke the functionality of replicating data in a distributed system. Additionally, any storage techniques used in connection with replicating data in a distributed system can invariably be a combination of hardware and software.

While replicating data in a distributed system has been described in connection with the example embodiments of the various figures, it is to be understood that other similar embodiments can be used or modifications and additions can be made to the described embodiments for performing the same functions of replicating data in a distributed system without deviating therefrom. Therefore, replicating data in a distributed system as described herein should not be limited to any single embodiment, but rather should be construed in breadth and scope in accordance with the appended claims.

What is claimed:

1. A system for replicating data in a distributed system, the system comprising:
   a plurality of devices comprising:
      a primary device for storing a replica of the data; and
      at least one secondary device, wherein:
         each one of the at least one secondary device is for storing a respective replica of the data; and
         absent a detection of a failure in one of the primary device and a secondary device, read operations and write operations are performed without consulting a global state management service; and
   the global state management service for:
      designating one of the plurality of devices in the distributed system as the primary device;
      designating from the plurality of devices the at least one secondary device;
      if a failure is detected in a secondary device, granting permission to the primary device to perform at least one of a write operation and a read operation; and
      if a failure is detected in the primary device, reallocating one of the at least one secondary device as a primary device.

2. A system in accordance with claim 1, the global state management service further for detecting the failure.

3. A system in accordance with claim 1, wherein the global state management service comprises a device other than the primary device and the at least one secondary device.

4. A system in accordance with claim 1, the global state management service further for instructing the reallocated primary device to assume processing for the failed primary device.

5. A system in accordance with claim 4, wherein the replica data of the reallocated primary device replaces the data of the failed primary device.

6. A system in accordance with claim 4, the global state management service further for managing the plurality of devices such that the reallocated primary device assumes processing for the failed primary device without intervention of a user of the system.

7. A system in accordance with claim 1, wherein:
   if a failure is detected in a secondary device, the global state management service grants permission, for a predetermined amount of time, to the primary device to perform at least one of a write operation and a read operation.

8. A system in accordance with claim 7, wherein:
   prior to expiration of the predetermined amount of time and upon receiving a request to renew the permission, the global state management service renews the permission.

9. A system in accordance with claim 8, wherein:
   if a failure is detected in the primary device and subsequent expiration of the predetermined amount of time, the global management service reallocates one of the at least one secondary device as a primary device.

10. A system in accordance with claim 1, wherein the primary device performs a write operation in a single round of message exchange comprising:
    providing, by the primary device, a write request to at least one live secondary device, wherein a live secondary device is a secondary device in which a failure has not been detected; and
    receiving, by the primary device, a reply from each live secondary device.

11. A method for replicating data in a distributed system comprising a global state management service, a primary device, and at least one secondary device, the method comprising:
    if no indication has been received that one of the primary device and a secondary device has failed, managing, by the primary device, read and write operations between the primary device and the at least one secondary device, wherein:
       a write operation is performed in a single round of message exchange comprising:
          providing, by the primary device, a write request to at least one live secondary device, wherein a live secondary device is a secondary device in which a failure has not been detected; and
          receiving, by the primary device, a reply from each live secondary device; and
    if an indication has been received that one of a primary device and a secondary device has failed, managing by the global state management service one of recovery and reallocation of the failed device, wherein if a secondary device has failed, granting permission to the primary device to perform at least one of a write operation and a read operation.

12. A method in accordance with claim 11, further comprising:
    if a failure is detected in the primary device, reallocating one of the at least one secondary device as a reallocated primary device.

13. A method for replicating data in a distributed system comprising a global state management service, a primary device, and at least one secondary device, the method comprising:
    maintaining, by at least one of the global state management service and the primary device, a state of the primary device and the at least one secondary device;
    managing, by at least one of the global state management service and the primary device, a transition between states of the primary device and the at least one secondary device; and
    updating, by at least one of the global state management service and the primary device, a state of the primary device and the at least one secondary device, wherein absent a detection of a failure in one of the primary device and a secondary device, update operations are performed without interacting with the global state management service and, wherein if a failure is detected in a secondary device, update operations are performed with permission of the global state management service.

14. A method in accordance with claim 13, further comprising maintaining a portion of information pertaining to the state of the primary device and the at least one secondary device in the primary device and the at least one secondary device.

15. A method in accordance with claim 14, further comprising:
   maintaining a normal state of the primary device and the at least one secondary device, wherein the normal state is indicative of the primary device and the at least one secondary device being operational;
   while in the normal state, if a device fails, transitioning to a state indicative of a device being non-operational; and
   while in the normal state, if one of a read from a device and a write to a device occurs, remaining in the normal state.

16. A method in accordance with claim 15, further comprising:
   while in the state indicative of a device being non-operational, if the non-operational device becomes operational attempting to reconcile the non-operational device that is operational into the distributed system;
   if the attempt to reconcile is successful, transitioning to the normal state;
   if the attempt to reconcile is unsuccessful, remaining in the maintaining state indicative of a device being non-operational;
   while in the state indicative of a device being non-operational, if a read from a device occurs, remaining in the state indicative of a device being non-operational;
   while in the state indicative of a device being non-operational, if a write to the primary device occurs, transitioning to a state indicative of a device being stale, wherein a stale device comprises a non-operational device that has not been updated by a write operation.

17. A method in accordance with claim 13, further comprising, when the primary device and the at least one secondary device are non-operational, transitioning to a halt state indicative of neither the primary device nor the at least one secondary device being able to provide information.

18. A method in accordance with claim 13, further comprising:
   if a failure is detected in a secondary device, granting permission, for a predetermined amount of time, by the global state management service to the primary device to perform at least one of a write operation and a read operation; and
   prior to expiration of the predetermined amount of time and upon receiving a request to renew the permission, renewing, by the global state management service, the permission.

19. A method in accordance with claim 18, further comprising:
   if a failure is detected in the primary device and subsequent expiration of the predetermined amount of time, reallocating, by the global management service, one of the at least one secondary device as a primary device.

20. A method in accordance with claim 13, further comprising:
   performing a write operation in a single round of message exchange comprising:
      providing, by the primary device, a write request to at least one live secondary device, wherein a live secondary device is a secondary device in which a failure has not been detected; and
      receiving, by the primary device, a reply from each live secondary device.

* * * * *